United States Patent Office 3,833,585
Patented Sept. 3, 1974

---

3,833,585
(5R,8R)-8-(3-AZA-BICYCLO[3,2,2]NONAN-3-YLMETHYL)-6-METHYLERGOLENE
Paul Stadler, Biel-Benken, and Peter Stutz, Reinach, Switzerland, assignors to Sandoz Ltd., Basel, Switzerland
No Drawing. Filed Mar. 15, 1973, Ser. No. 341,510
Claims priority, application Switzerland, Mar. 17, 1972, 4,043/72, 4,044/72
Int. Cl. C07d 43/20
U.S. Cl. 260—285.5         1 Claim

ABSTRACT OF THE DISCLOSURE

This invention concerns the new compound, (5R,8R)-8 - (3-azabicyclo[3,2,2]nonan-3-ylmethyl) - 6 - methylergolene, useful as a sedative and sleep-promoting agent.

---

The present invention relates to 8-aminomethyl-6-methylergolene derivatives and especially (5R,8R)-8-(3-azabicyclo[3,2,2]nonan - 3 - ylmethyl)-6-methylergolene.

In accordance with the invention there is provided a new compound of formula I,

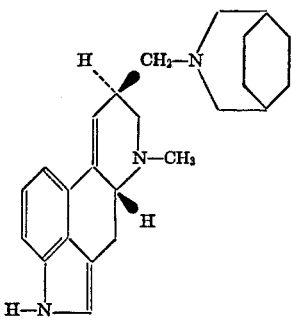

I

Further, in accordance with the invention, the compound of formula I may be obtained by a process comprising (a) selectively reducing the carbonyl group of the compound of formula II,

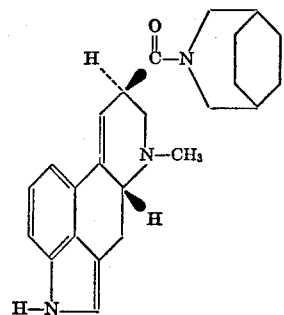

II in an inert solvent, or (b) reacting a compound of formula V,

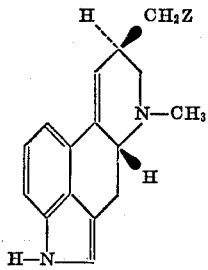

V wherein Z is O-tosyl, O-mesyl, chlorine or bromine, in a suitable solvent, with the compound of formula IV,

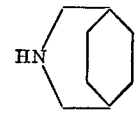

IV and, where an acid addition salt form of the compound of formula I is required, converting the resulting compound of formula I into such salt form.

The reduction in accordance with process variant (a) may be preferably effected with a reducing agent capable of selectively affecting the carbonyl group, using as inert solvent a cyclic or open chain ether, e.g. tetrahydrofuran, dioxane, diethyl ether or diglyme. Reducing agents which may be used are sodium aluminium hydride, diborane, and preferably lithium aluminium hydride. About 1 to 5 moles of reducing agent may be preferably used for every mole of the compound of formula II.

The reaction may be preferably carried out in the absence of light, and preferably in an inert atmosphere, such as nitrogen.

Decomposition of the reaction complex and working up of the reaction mixture may be effected in known manner, for example the reaction complex may be decomposed with ethyl acetate, but preferably with water, using about twice the theoretically calculated amount of ethyl acetate or water. The reduction product may be isolated by extraction of the resulting suspension with a water-immiscible solvent which is inert under the extraction conditions, preferably methylene chloride, or by concentration of the filtrates after filtering off the resulting aluminium hydroxide and washing out the residue.

The reduction with lithium aluminium hydride may, for example, be effected as follows:

The compound of formula II may be added at room temperature, while stirring, in an atmosphere of nitrogen, to a suspension of lithium aluminium hydride in tetrahydrofuran. The reaction mixture may be subsequently stirred at an elevated temperature for 1 to 2 hours, in the absence of light. The reaction complex may be then decomposed with about twice the theoretically calculated amount of water, while cooling, and the reaction mixture stirred for approximately 45 minutes at room temperature. The precipitated metal hydroxides may be filtered off and the residue may be washed with methylene chloride. The combined filtrates may be evaporated to dryness and the resulting crude product may be purified by crystallization.

The new compound of formula II, used as starting material in process variant (a), may be obtained by reacting a reactive, functional derivative of the acid of formula III,

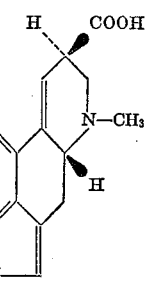

III in an inert organic solvent or solvent mixture, in the presence of an acid-binding agent, with the compound of formula IV. Partial isomerization at the 8-carbon atom may occur during this step, however subsequent reaction of the crude product with alkali in, for examples, methanol and chromatographic purification is one preferred method of obtaining the required isomer of formula II.

The acid chloride, azide or the mixed anhydrides of the acid of formula III with sulphuric acid or trifluoroacetic acid may, for example, be used as reactive derivatives of the acid of formula III. The reaction product obtained from the reaction of the acid of formula III with a chlorinating agent, such as thionyl chloride, phosgene, phosphorus oxychloride or oxalyl chloride, and an N-di(lower)alkyl-substituted amide of an aliphatic monocarboxylic acid containing 1 to 3 carbon atoms, such as dimethyl formamide or dimethyl acetamide, may likewise be used.

The condensation may be effected preferably in the absence of light. The reaction may be preferably effected at a temperature from −20 to 0° C.; aprotic solvents such as dimethyl formamide, acetonitrile, methylene chloride or mixtures thereof may, for example, be preferably used as solvents. Pyridine or an analogue thereof, may be preferably used as acid-binding agent.

The reaction of a compound of formula V with a compound of formula IV in accordance with process variant (b) may, for example, be effected in dimethyl formamide or hexamethyl phosphoric acid trisamide. Preferably 2 to 5 moles of the compound of formula IV are used for every mole of the compound of formula V. The reaction may be effected at a temperature from 60 to 120° C., preferably at 60° C. The reaction may be preferably effected in an atmosphere of nitrogen and preferably in the absence of light.

Working up may be effected by pouring the reaction mixture into a sodium carbonate solution and purifying the precipitated reaction product in known manner.

For instance, the compound of formula Va,

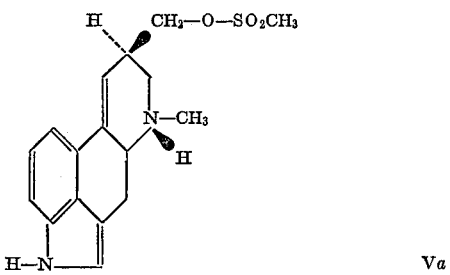

Va used as starting material in process variant (b), may be produced, for example, in accordance with the following process:

2 to 3 mole equivalents of methane sulphonyl chloride are slowly added to the compound of formula VI,

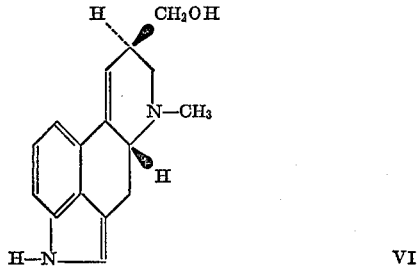

VI in the presence of an acid-binding agent such as pyridine, in an inert organic solvent, preferably acetonitrile, at such a rate that the temperature does not exceed +40° C. The mixture is allowed to react at room temperature for approximately two hours, is cooled to 0° C., and a 2 N ammonia solution is added until a clearly alkaline reaction is obtained. The compound of formula Va may be obtained in crystalline form, and may be used for the next reaction after drying in a high vacuum at 80° C.

Insofar as the production of the starting materials is not particularly described, these are known or may be produced in accordance with known processes, or in a manner analogous to known processes.

The compound of formula I, (5R,8R)-8-(3-azabicyclo[3,2,1]nonan-3-ylmethyl)-6-methylergolene, produced in accordance with the invention, is a crystalline compound at room temperature, which, with strong inorganic or organic acids, forms stable salts which are crystalline at room temperature. Free base forms of the compound of formula I may be converted into acid addition salt forms and *vice versa* in conventional manner.

The compound of formula I exhibits interesting pharmacodynamic properties and is therefore indicated for use as a medicament.

The compound of formula I has not been described in the literature.

The compound of formula I is useful because it possesses pharmacological activity in animals. In particular, the compound of formula I is useful as a sedative agent as indicated in standard tests, for example, by:

(i) an inhibition of exploratory behaviour in mice in the climbing test on i.p. administration of from 1 to 3 mg./kg. animal body weight, and p.o. administration of from 1 to 30 mg./kg. animal body weight, of the compound;

(ii) an inhibiton of spontaneous motility in mice in the light barrier test on p.o. administration of from 3 to 30 mg./kg. animal body weight, of the compound;

(iii) an inhibition of conditioned avoidance behaviour in the shuttle box test in rats on p.o. administration of from 10 to 20 mg./kg. animal body weight, and in monkeys on p.o. administration of from 1 to 3 mg./kg. animal body weight, of the compound;

(iv) a potentiation of barbiturate-induced narcosis in mice on i.p. administration of from 10 to 30 mg./kg. animal body weight, of the compound;

(v) an antagonism of the stimulating effect of amphetamine in mice on p.o. administration of from 3 to 30 mg./kg. animal body weight, of the compound; and (vi) a centrally conditioned muscle relaxation in rabbits on i.v. administration of from 0.1 to 1 mg./kg. animal body weight, of the compound.

For the above mentioned use the dosage will, of course, vary depending on the form of the compound employed, mode of administration and therapy desired. However, in general, satisfactory results are obtained when administered at a daily dosage of from 0.1 mg. to about 30 mg. per kg. animal body weight conveniently given in divided doses 2 to 4 times a day or in sustained release form. For the larger mammals, the total daily dosage is in the range from about 5 to about 50 mg., preferably from about 25 to about 50 mg., and dosage forms suitable for oral administration comprise from about 1 mg. to about 25 mg. of the compound admixed with a solid or liquid pharmaceutical carrier or diluent.

The compound of formula I is furthermore useful as a sleep promoting agent as indicated in electro-encephalographic examinations by a sleep promoting effect in the sleep-waking cycle of rats, cats and monkeys, in particular, on p.o. administration of from 3 to 10 mg./kg. animal body weight, and on i.p. administration of from 1 to 3 mg./kg. animal body weight, of the compound to rats;

on i.p. administration of from 0.5 to 4 mg./kg. animal body weight, of the compound to cats; and on p.o. administration of from 0.1 to 4 mg./kg. animal body weight, of the compound to monkeys;

and as further indicated by an inhibition of the arousal reaction produced by a stimulus of the posterior hypothalamus in cats on i.v. administration of from 1 to 10 mg./kg. animal body weight, of the compound.

For this use the dosage will, of course, vary depending on the form of the compound employed, mode of administration and treatment desired. However, in general, satisfactory results are obtained when administered at a daily dosage of from about 0.1 mg. to about 30 mg. per kg. animal body weight, conveniently given in divided doses 2 to 4 times a day or in sustained release form. For the larger mammals, the total daily dosage is in the range from about 5 to about 50 mg., preferably from about 25 to about 50 mg., and dosage forms suitable for oral administration comprise from about 1 mg. to about 25 mg. of the compound admixed with a solid or liquid pharmaceutical carrier or diluent.

The compound of formula I may be administered in pharmaceutically acceptable acid addition salt form. Such acid addition salt forms exhibit the same order of activity as the free base form and are readily prepared in conventional manner. Representative acid addition salt forms include organic acid salt forms such as the benzene sulphonate and methane sulphonate and mineral acid salt forms such as the hydrochloride, hydrobromide, phosphate and sulphate. A pharmaceutical composition may comprise a compound of formula I, in free base form or in pharmaceutically acceptable acid addition salt form, in association with a pharmaceutical carrier or diluent. Such compositions may be prepared by conventional techniques to be in the form of, for example, capsules, tablets, suppositories, suspensions or solutions, for enteral or parenteral administration. Aside from the usual pharmaceutical diluents or carriers, e.g. water, alcohols, natural or hardened oils and waxes, these pharmaceutical compositions may contain suitable preserving, stabilizing, wetting, solubilizing, sweetening, flavouring or colouring agents.

In the following non-limitative examples all temperatures are indicated in degrees centigrade.

Example 1: (5R,8R) - 8 - (3-azabicyclo[3,2,2]nonan-3-ylmethyl)-6-methylergolene [process variant (a)]

2.96 g. (78 millimols) of lithium aluminium hydride are added to 100 cc. of absolute tetrahydrofuran in an atmosphere of nitrogen, whereby the temperature rises to 35°. The reaction mixture is allowed to cool to 20° and a solution of 14.6 g. (39 millimols) of N-lysergyl-azabicyclo[3,2,2]nonane in 340 cc. of absolute tetrahydrofuran is then added dropwise within 10 minutes. The resulting yellow-green suspension is stirred at reflux temperature for 90 minutes, in the absence of light and in a stream of nitrogen. The reaction mixture is subsequently cooled to —5° and a total of 10 cc. of water is carefully added dropwise. Stirring is effected at room temperature for 45 minutes and filtration is then effected; the residue is treated several times with methylene chloride. The combined yellow-green filtrates are evaporated to dryness. A crude product is obtained in the form of a yellow foam which crystallizes from methylene chloride/ethanol. The pure title compound in free base form has a M.P. from 190° (decomp.); $[\alpha]_D^{20}=+67°$ (c.=0.5 in ethanol).

A further amount of base may be obtained by concentration of the mother liquors, chromatography on a 60-fold quantity of Alox (activity II) and elution with methylene chloride/0.2% of methanol.

Bismethane sulphonate: 5.3 g. (14.7 millimols) of the free base form of (5R,8R)-8-(3-azabicyclo[3,2,2]nonan-3-ylmethyl)-6-methylergolene are dissolved in a mixture of methylene chloride/methanol and 2.83 g. (29.4 millimols) of methanesulphonic acid are added. The mixture is concentrated, whereby a concentrated solution is obtained, which is diluted with acetone. Scraping is effected, whereby a thick crystalline mash is obtained, which is filtered off, washed with acetone and dried.

The crystalline bismethane sulphonate salt form has a M.P. of 120–130° (decomp.); $[\alpha]_D^{20}=+79°$ (c.=1 in ethanol).

The N-lysergyl - 3 - azabicyclo[3,2,2]nonane, used as a starting material, may be produced as follows:

(a) A mixture of 50 cc of absolute dimethyl formamide and 100 cc. of absolute acetonitrile is cooled to —15°, and 9.5 g. (75 millimols) of oxalyl chloride, diluted with 20 cc. of absolute acetonitrile, are added dropwise within 15 minutes. Stirring is effected at —10° for a further 10 minutes. 20.1 g. (75 millimols) of dry lysergic acid are added to this suspension and subsequently 25 cc. of absolute pyridine are added, at such a rate that the temperature does not exceed —15°. 6.26 g. (50 millimols) of 3-azabicyclo[3,2,2]nonane, dissolved in 25 cc. of absolute pyridine, are then added dropwise at —15°, and the reaction mixture is stirred at 0° for a further hour and 15 minutes in the dark.

Working up is effected by pouring the mixture into 500 cc. of a 2 N soda solution and extracting with methylene chloride. The N-isolysergyl-3-azabicyclo[3,2,2]nonane in the crude product obtained after concentrating by evaporation is isomerized by adding a solution of 4 g. of a caustic potash solution in 400 cc. of methanol and maintaining at the boil for one hour, under nitrogen and in the absence of light. The pH of the solution is adjusted to 9 with carbon dioxide, concentration is effected and the product is worked up with methylene chloride with the addition of a soda solution. The resulting product is chromatographed on a 40-fold quantity of Alox (activity II). Elution with methylene chloride/0.2% of methanol yields the desired base, having a M.P. of 131–132°.

4.05 g. (15 millimols) of dry lysergic acid are suspended in 15 cc. of absolute acetonitrile. 3.78 g. (18 millimols) of trifluoroacetic acid anhydride, dissolved in 15 cc. of absolute acetonitrile, are added within 3 minutes at —20° and stirring is effected for a further 15 minutes. 5 cc. of pyridine are added to the resulting solution at —20°, and a solution of 1.25 g. (10 millimols) of 3-azabicyclo[3,2,2]nonane, dissolved in 15 cc. of absolute pyridine, is then immediately added. The temperature is allowed to rise to 0° within 30 minutes and stirring is effected at 0° for a further 2½ hours. The mixture is subsequently cooled to —20° and 15 cc. of a buffer solution having a pH of 4 are added dropwise. Working up is effected by pouring the mixture into approx. 100 cc. of a 2 N soda solution with the addition of chloroform and extracting thrice with chloroform. The extracts are washed with a 0.5 N soda solution, dried over sodium sulphate and concentrated. Isomerization is effected as indicated in section (a).

The base may be purified via the bimaleate, which crystallizes from ethanol with a M.P. from 198° (decomp.); $[\alpha]_D^{20}=+22.4°$ (c.=1 in pyridine).

Example 2: (5R,8R)-8-(3-azabicyclo[3,2,2]nonan-3-yl-methyl)-6-methylergolene [process variant (b)]

375 mg. (3 millimols) of 3-azabicyclo[3,2,2]nonane are added to a solution of 332 mg. (1 millimol) of 6-methyl-8β-mesyloxymethylergolene in 5 cc. of dimethyl formamide. The reaction mixture is heated and kept at 60° for 24 hours in the absence of light and in a nitrogen atmosphere. Working up is effected by adding a 2 N soda solution and extracting with methylene chloride, containing 5% of methanol. The organic phase is dried over sodium sulphate, concentrated by evaporation, and the resulting crude product is chromatographed on a 50-fold quantity of Alox (activity II), eluant: methylene chloride/0.2% of methanol. The pure title compound crystallizes from methylene chloride/ethanol, M.P. from 190° (decomp.); $[\alpha]_D^{20}=+67°$ (c.=0.5 in ethanol).

Bismethane sulphonate: M.P. 120–130° (decomp.); $[\alpha]_D^{20}=+79°$ (c.=1 in ethanol).

The 6-methyl-8β-mesyloxymethylergolene, used as starting material, may be produced as follows:

A solution of 2.35 cc. (30 millimols) of methanesulphonyl chloride in 5 cc. of absolute acetonitrile is added dropwise to a stirred suspension of 2.54 g. (10 millimols) of lysergol in 15 cc. of absolute pyridine and 25 cc. of absolute acetonitrile at such a rate that the internal temperature does not exceed +40°. After stirring at room temperature for 2 hours, the reaction mixture is cooled to 0° and is diluted with a 2 N ammonia solution until a clear alkaline reaction is obtained. The crystalline precipitate is filtered, washed with water and dried in a high vacuum at 80°.

The M.P. of the title compound is not characteristic and is strongly dependent on the heating rate. $[\alpha]_D^{20} = +60.1°$ (c.=1 in dimethyl formamide).

What is claimed is:

1. (5R,8R) - 8 - (3-azabicyclo[3,2,2]nonan-3-ylmethyl)-6-methylergolene or a pharmaceutically acceptable acid addition salt thereof.

References Cited

UNITED STATES PATENTS

| 3,583,991 | 6/1971 | Troxler et al. | 260—285.5 |
| 3,646,046 | 2/1972 | Arcamone et al | 260—285.5 |

DONALD G. DAUS, Primary Examiner

M. C. VAUGHN, Assistant Examiner

U.S. Cl X.R.

424—261; 260—239 BA